United States Patent [19]

Rackliffe et al.

[11] 4,064,747
[45] Dec. 27, 1977

[54] RELATIVE AND SUB-CYCLIC SPEED MEASUREMENTS FOR INTERNAL COMBUSTION ENGINE DIAGNOSTICS

[75] Inventors: Richard J. Rackliffe, Agawam, Mass.; Harvey J. Goodfriend, Simsbury; Lee R. Armstrong, Enfield, both of Conn.

[73] Assignee: United Technologies Corporation, Hartford, Conn.

[21] Appl. No.: 684,033

[22] Filed: May 7, 1976

[51] Int. Cl.² .......................................... G01M 15/00
[52] U.S. Cl. ...................................... 73/116; 364/551
[58] Field of Search .................... 73/116, 117.3, 118, 73/119; 235/150.2, 150.3; 324/161, 16 R

[56] References Cited

U.S. PATENT DOCUMENTS

| | | | |
|---|---|---|---|
| B 569,859 | 3/1976 | Hanson | 73/116 |
| 3,870,869 | 3/1975 | Eberle et al. | 235/92 CC X |
| 3,955,135 | 5/1976 | Fastaia | 324/16 R |
| 3,964,301 | 6/1976 | Hanson et al. | 73/116 |

*Primary Examiner*—Jerry W. Myracle
*Attorney, Agent, or Firm*—M. P. Williams

[57] ABSTRACT

Substantially instantaneous, sub-cyclic speed of an internal combustion engine provided by clock counts between successive sensing of integral numbers of teeth on the flywheel of the engine provide plural speed indications within each cylinder stroke engine sub-cycle, which are utilized relative to each other, without conversion to speed dimensions, to determine dynamic, sub-cyclic operating parameters of the engine, such as relative power contribution of the individual cylinders of the engine.

7 Claims, 6 Drawing Figures

RELATIVE AND SUB-CYCLIC SPEED MEASUREMENTS FOR INTERNAL COMBUSTION ENGINE DIAGNOSTICS

CROSS REFERENCE TO RELATED APPLICATIONS

The subject matter herein disclosed may be utilized in conjunction with the subject matter disclosed and claimed in commonly owned copending applications filed on even date herewith by Stick et al, Ser. No. 684,037, entitled DETERMINATION OF NUMBER OF TEETH ON AN INTERNAL COMBUSTION ENGINE FLYWHEEL; by Willenbecher et al, Ser. No. 684,036, entitled SPEED-RELATED INDICATION COMPARISONS IN INTERNAL COMBUSTION ENGINE DIAGNOSTICS; and by Tedeschi, Ser. No. 684,221, entitled ENGINE, CYLINDER IDENTIFICATION (CID) TRANSDUCER.

BACKGROUND OF THE INVENTION

1. Field of the Invention

This invention relates to diagnosing internal combustion engines electronically.

2. Description of the Prior Art

The diagnosis or analysis of conditions and parameters in internal combustion engines has received a great deal of attention in the art over a long period of time. Recent advances in engine diagnostics have tended toward utilization of electronic processing equipment and improved techniques for sensing parameters and conditions on the engine. There are a variety of techniques which may be applicable to engine diagnostics for analyzing particular conditions in the engine, provided measurements can be made of speed profiles of the engine, across an engine cycle, including minute variations in speed which occur within the individual cylinder sub-cycles.

As an example, consider diagnostics which indicate the actual performance of individual cylinders. One measure of engine condition which is known in the art is commonly referred to as relative power contribution; this provides, in a variety of ways, an indication bearing some sort of relationship to the manner in which each cylinder of the engine contributes more or less to the overall power generated by the engine. A most common method or technique used to determine relative power contribution of a spark-ignition engine is selectively defeating the ignition of one cylinder at a time while measuring the decrease in average speed of the engine while each cylinder is defeated, and then comparing, typically on a ratio basis, the loss in average speed attributable to the defeat of the ignition of each cylinder. In non-spark engines (such as diesel engines), it is possible to selectively defeat the injection of fuel into cylinders and provide a similar type of relative power contribution measurement. Ostensibly, the cylinder which causes the greatest decrease in speed, when defeated, is the healthiest cylinder, normally providing the greatest contribution. However, in both spark ignition engines and non-spark ignition engines the instantaneous speed of the engine affects the power stroke of other cylinders, so that these measurements are not as accurate as could be desired.

Thus, a realistically appropriate measurement of relative cylinder power contribution for internal combustion engines has not been available heretofore in the art, since it relies on full-cycle average speed. There are other engine diagnostic techniques which relate directly to speed of an engine, and more particularly to instantaneous, sub-cyclic speed of the engine which permits gathering data relating to the speed variations in an engine which occur on a cylinder-by-cylinder basis, rather than gross or average speed over a full cycle or several cycles. In many instances, such speed measurements may be required during a snap or burst acceleration of the engine whenever the engine cannot be operated on a vehicle disposed on a dynomometer to control speed regardless of the power output of the engine. In other cases, the measurements to be made, similar to the relative power contribution measurements described hereinbefore, have to be made in a time frame relating to the power strokes of the individual cylinders of the engine, which time is relatively small compared with processing of parameters according to complex algorithms. And, even though speed indications can be derived from an engine, they are useless for dynamic engine diagnostics unless they are processed in a time frame which is relatively small in contrast with cylinder firing time of an engine while operating at its maximum speed.

SUMMARY OF THE INVENTION

Objects of the invention include provision of sub-cyclic speed dynamic analysis of internal combustion engines in the diagnosis thereof; provision of diagnostic information of an internal combustion engine through analysis of relative speed indications without the need for converting such indications to speed dimensions; and improvements in measurements of relative cylinder power contribution in internal combustion engines.

According to the present invention, internal combustion engine diagnostics are based upon sensing of speed indications on a sub-cyclic basis, which provide indications of speed profiles within the individual cylinder portions of an engine speed profile. According further to the invention, indications of sub-cyclic, instantaneous speed of an engine are utilized in a relative fashion without conversion to speed dimensions, the speed indications relative to one parameter being compared against speed indications relative to another parameter so that constants required for expression in speed dimensions are rendered immaterial. In accordance still further with the present invention, the foregoing attributes of the present invention are employed in the diagnostic analysis of the relative power contribution of the cylinders of an internal combustion engine.

In accordance with an exemplary aspect of the present invention, the relative cylinder power contribution of the respective cylinders of an internal combustion engine is determined by measuring the instantaneous speed of the engine a plurality of times for each cylinder of the engine during one engine cycle, said plurality of times being spaced apart by an interval which is a significant portion of the cylinder stroke sub-cycle, the speed indications determined across the time interval for each cylinder being a measure of the acceleration occurring during the combustion stroke of the related cylinder, which, on comparison with similar speed indication measurements made for other cylinders, provides a measure of the performance of each cylinder with respect to the others in generating power in a full cycle of engine operation.

The invention provides true engine dynamic analysis, by measuring conditions of the engine within the strokes of the individual cylinders; the invention avoids time delays and complexities of processing by providing relative speed indication measurements without conversion to speed dimensions; the invention further provides, utilizing the features thereof, improved relative cylinder power contribution analysis of an internal combustion engine.

The foregoing and various other objects, features and advantages of the present invention will become more apparent in the light of the following detailed description of preferred embodiments thereof, as illustrated in the accompanying drawing.

DESCRIPTION OF THE PREFERRED EMBODIMENTS

Figure 1:
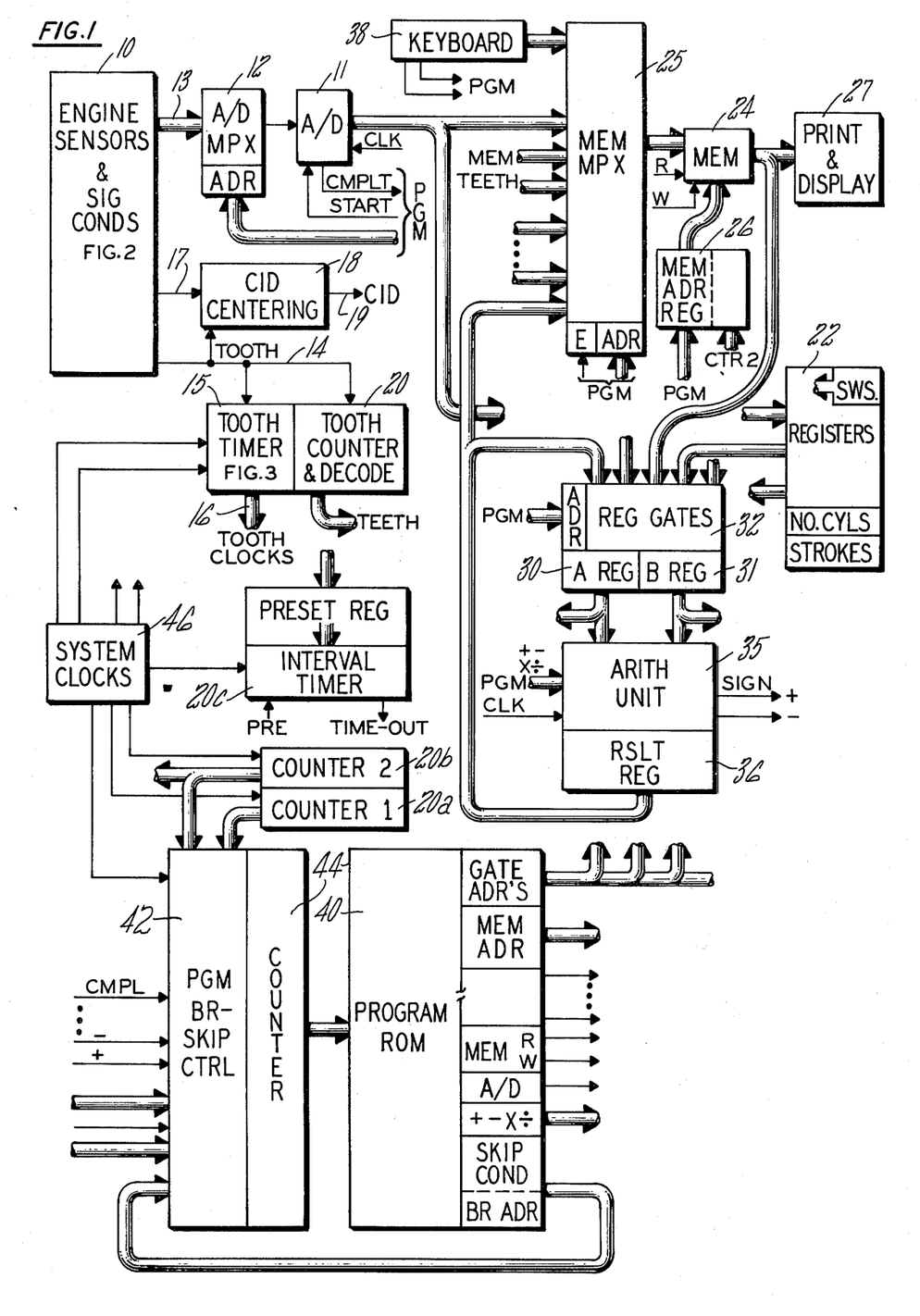
FIG. 1 is a simplified schematic block diagram of a diagnostic system including engine parameter sensing apparatus and exemplary electronic processing apparatus, in which the present invention may be incorporated.

Referring now to FIG. 1, a system which may incorporate the present invention is illustrated as representing the architecture of a typical data processing system or computer together with special purpose apparatus related to an engine diagnostic system of the type in which the invention may be incorporated. Specifically, the system incorporates engine sensors and signal conditioners 10 of a well known type which are adapted to be disposed for response to various parameters or discrete conditions on an engine under test, as described more fully hereinafter. Some of the sensors relate to pressures, temperatures and the like and are therefore analog signals, the magnitude of which is a measure of the parameter being sensed. The outputs of the sensors are fed over lines 13 to an analog to digital converter (A/D) 11 when selected by an A/D multiplexer 12 in response to a particular sensor address applied thereto by the program of the data processor. In addition, a tooth sensor may sense the passage of teeth on the flywheel of the engine to provide a tooth signal on a line 14, the intertooth time interval of which (when the engine is running) is measured by a tooth timer 15 and provided on tooth count lines 16. Another discrete signal is a cylinder or cycle identification signal (CID) on a line 17 which is applied to a CID centering circuit 18 to provide a CID signal on a line 19. The raw CID signal on the line 17 is a signal from a proximity sensor disposed to sense movement of an engine member once in each cycle of the engine, such as the rocker arm for the intake valve of one of the cylinders or a cam, if desired; this provides information of the cylinder-by-cylinder position of the engine at any moment in time in the same fashion as the number one firing in a spark ignition engine, and also provides cycle-to-cycle division of the engine's angular position as it is running or cranking.

In accordance with the invention, the parameters of the engine as provided through the A/D converter 11, and the instantaneous position information with respect to the engine as provided by the CID signal on the line 17 and the tooth signals on the line 14 may be used in diagnosis of the engine in accordance with the invention herein.

Additional special apparatus which may be used (although as described hereinafter is not necessarily required) includes a tooth counter and decode circuit 20, and a pair of counters 20a, 20b referred to as counter 1 and counter 2, and an interval timer 20c, and special purpose registers 22, which may be used (as an alternative to memory) to retain certain factors that are used so often as to render it advisable to have them directly available to the program rather than having to access them in memory, in order to cut down processing time and complexity of programming. Such registers may contain factors utilized in processing data (such as multiplicands used in digital filtering of the data and the like) and information relating to the particular engine under test (such as number of strokes and cylinders) which may be entered by switches manipulated by an operator, the switches feeding binary decode circuits such that the decode constantly reflects the position of the switch on a steady state basis in the manner of a register.

The remainder of FIG. 1 is illustrative of one type of data processing apparatus, which is shown for illustrative purposes herein since it is a type that may be advantageous for use where general purpose programming is not required, but rather limited functions are to be performed. A computer, as is known in the art, includes memory (or accessible storage), and arithmetic unit, program control, and the necessary gates, data flow and event decode or monitoring circuits so as to permit advancing logically through the steps which are to be performed. Specifically, a memory 24 may be loaded from a variety of inputs shown on the data flow under control of a memory multiplexer 25 which is enabled and addressed by the program so as to select which of the possible inputs to memory are to be applied thereto, if any. The memory 24 is responsive to a memory address register 26 which may respond to a counter used in program control in a usual fashion. The output of the memory is available to other positions of the data flow, such as print and display apparatus 27 and the arithmetic apparatus including arithmetic unit input registers, referred to herein as an A register 30 and a B register 31 under control of register gates 32 which are controlled by the program in a known fashion. Herein, the output of the A register and the B register is available to the register gates 32 and to the main data flow, so that their contents may be moved between the registers 30, 31 or to the memory 24. This is to facilitate the particular type of processing which may be employed in an engine diagnostic system, as is described more fully hereinafter. The registers 30, 31 feed an arithmetic unit of a known type 35, the function of which, controlled by the program, is to add, subtract, multiply or divide, to provide answers to a result register 36 as well as providing indications of the sign of the result. As indicated in FIG. 1, the result register may be available at the input to the arithmetic unit through the gates 32; alternatively, as is common in many computers the result register could be automatically one of the inputs to the arithmetic unit, and it can be loaded directly from the memory upon a proper command.

In order to provide data inputs to the memory for initialization and to permit a degree of control over the system during processing, a keyboard 38 of a usual variety may be provided. In addition to data inputs, the keyboard may have control function keys that permit choice to the operator of loading memory from the result register or of loading memory in response to the keyboard, depending upon conditions which may be displayed in the print and display apparatus 27.

For the rather limited number of tests being performed in apparatus incorporating the present invention, the program may be controlled in a variety of ways. One way is a program ROM 40 which provides input gate addresses to control the inputs to the memory, the arithmetic input registers, and the A/D converter, etc.; the memory address; the functions to be performed by the arithmetic unit, and other commands such as commands to the memory to cause it to read or write, and to start the A/D converter 11, and the like. Sequencing is controlled by unconditional branch instructions (which provide a branch address) and by skip instructions (dependent on conditions) provided to a branch/skip control 42 at the input to the program counter 44, which is also responsive to system clocks 46. Thus, as is known, for each program clock signal received from the system clocks, the program counter may be advanced, skipped once or twice, or reset to the branch address, in dependence upon the presence of branch or skip instructions.

It should be understood that the particular processing apparatus used, and the degree of use of special purpose apparatus, is dependent upon the particular implementation of the present invention which is to be made, and forms no part of the present invention. If the invention is utilized in a complex, sophisticated diagnostic system in which a variety of diagnostic functions are required, then the type of apparatus selected for processing may be more sophisticated and capable of general purpose utilization in order to accommodate the special requirements of all of the diagnostic procedures to be performed. However, the cost of programming complexity of such a processing system may be unwarranted in a diagnostic system which performs either relatively few or relatively simple tests. As is more apparent in the light of detailed operational descriptions hereinafter, well known processing systems (such as NOVA and PDP/11) employing only programs provided through techniques well known in the art, may be utilized in conjunction with the engine sensors and conditioners 10, suitable input and output apparatus (such as the keyboard 38 and the print and display apparatus 27) and, depending on the processing power of the data processing system selected, some special purpose hardware which may be found advisable, such as the tooth timer 15, the tooth counter 20 and some special registers 22. However, the well known processing systems referred to hereinbefore can provide adequate memory capacity to perform the tooth timing and counting functions, and to provide for the storage of all required parameters and engine information in the memory, as is readily apparent to those skilled in the art.

Figure 2:
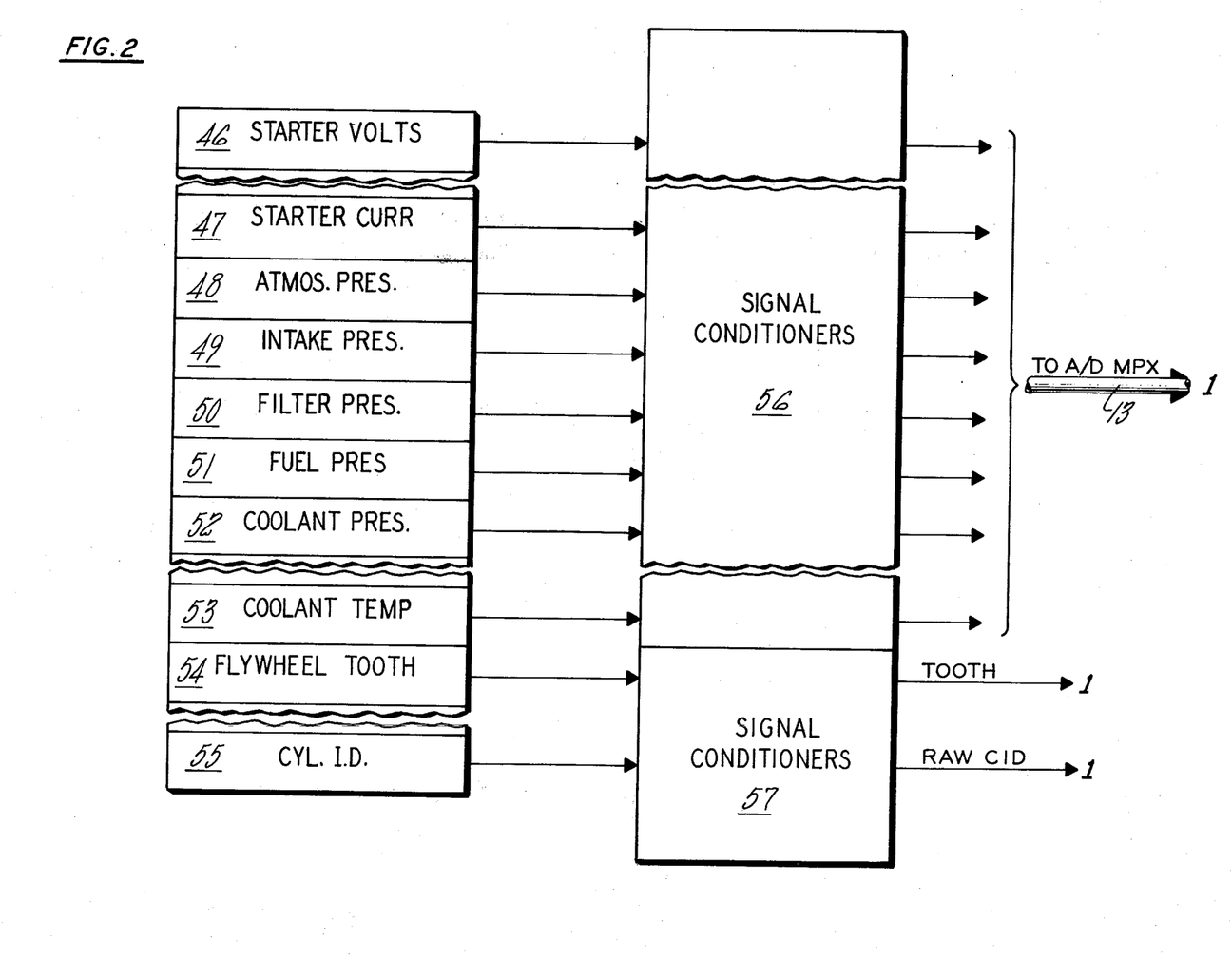
FIG. 2 is a simplified block diagram of engine parameter sensing apparatus for use in the embodiment of FIG. 1.

Referring now to FIG. 2, a plurality of engine sensors in a diagnostic system incorporating the present invention may include, among others not shown in FIG. 2, a starter voltage probe or clamp 46, a starter current probe 47, an atmospheric pressure transducer 48, which could be disposed in general proximity to the engine under test, a pressure transducer 49 to measure the intake manifold air pressure, a filter pressure transducer 50 to measure the pressure of the fuel downstream of the fuel inlet filter, a fuel pressure transducer 51 to measure the pressure at the fuel injector inlet rail of the engine, a coolant pressure transducer 52 which may preferably measure the pressure of coolant at the inlet to the coolant thermostat, a coolant temperature transducer 53 to measure coolant temperature, preferably at the inlet to the thermostat. In a diagnostic system incorporating the present invention there may also be a proximity sensor 54, which may comprise an RGT Model 3010-AN Magnetic Proximity Sensor, provided by Electro Corporation, Sarasota, Florida, for sensing the passage of flywheel teeth past a particular point adjacent to the flywheel housing, and a proximity sensor 55 such as a Model 4947 Proximity Switch distributed by Electro Corporation, for sensing the presence of an engine member which moves in a unique fashion once in each cycle of the engine, which is one revolution in a two stroke engine or two revolutions in a four stroke engine. The proximity sensor 55 may preferably be mounted through the valve cover adjacent to a rocker arm related to the intake valve of one of the cylinders of the engine, thereby to provide information as to the particular point of an engine cycle once in each cycle, as well as to delineate successive engine cycles as the engine is rotating.

Each of the sensors of FIG. 2 is applied to a suitable one of a plurality of signal conditioners 56, 57 to filter out unwanted noise, and to provide, through an amplifier, suitable level adjusting as is appropriate for the circuitry being fed thereby. For instance, the signal conditioners 56 scale the signals to the proper level so that each of them can be fed through a common A/D converter 12 (FIG. 1). The signal conditioners 56, 57 can be suitable ones of a wide variety known in the art, and form no part of the present invention.

Figure 3:
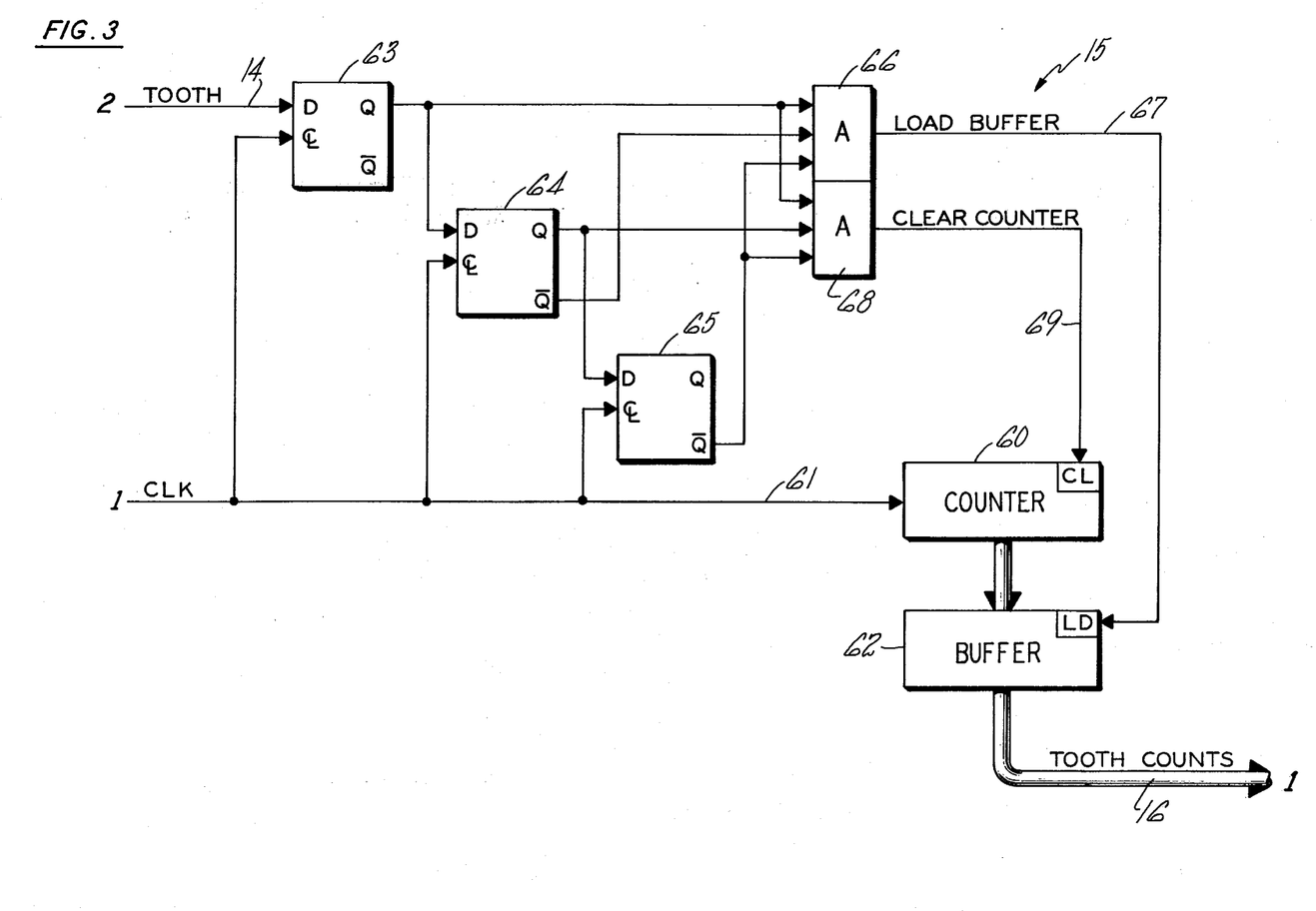
FIG. 3 is a simplified schematic diagram of tooth timer means for obtaining instantaneous, sub-cyclic engine speed in the embodiment of FIG. 1.

Referring now to FIG. 3, the tooth timer 15 includes a counter 60 which repetitively counts clock pulses on a line 61 that may be supplied by system clocks 46 in FIG. 1. The counter is parallel-fed to a buffer 62, the output of which comprises the tooth counts. The counter is running substantially all of the time since a very high frequency clock signal can be utilized on the line 61 (anywhere from tens of KHz to tens of MHz) whereas at speeds from 300 rpm to 2,000 rpm the frequency of the tooth signals on the line 14 may be on the order of 10 Hz to 100 Hz, depending upon the number of teeth. Thus the few clock signals lost during the tooth to tooth resetting of the counter are miniscule.

Each time that a tooth signal appears on the line 14, the next clock signal will set a D-type flip flop 63, the Q output of which is applied to a D-type flip flop 64. The second clock signal following the tooth signal therefore sets the D-type flip flop 64, and since its Q output is applied to a D-type flip flop 65 the third clock signal will cause it to become set. The very first clock signal, after the appearance of the tooth signal, is decoded by an AND circuit 66 since it responds to Q of flip flop 63 and not Q of flip flop 64 and 65; this provides a load buffer signal on a line 67 to cause the buffer 62 to be loaded in parallel from the counter 60. The second clock signal following the appearance of the tooth signal will cause an AND circuit 68 to respond to the Q of flip flops 64 and 64 and the not Q of flip flop 65 so as to generate a clear counter signal on a line 69 which is applied to the clear input of the counter 60 causing it to be cleared to zero. The third clock signal, by setting the flip flop 65, simply eliminates the clear counter signal on the line 69 so that the next leading edge of the clock signal and all subsequent clock signals will be counted in the counter 60. Whenever the tooth signal disappears, (which is totally immaterial) the next three clock signals in a row will cause resetting of the flip flops 63-65, in turn, since each of their D inputs will go down. The counter and the buffer are independent of the resetting of the flip flops 63-65 since both AND circuits 66, 68 operate only during a progression with flip flop 63 on and flip flop 65 off, which does not occur during the resetting of the flip flops.

Thus the tooth timer 15 provides tooth counts on the line 16 which are stable, throughout substantially each intertooth interval. The processing apparatus of FIG. 1 may therefore sample the tooth counts at random. The tooth timer 15 thereby provides very accurate, subcyclic speed measurement, on a tooth to tooth basis, which provides speed indications many times within each individual cylinder stroke portion of each engine cycle.

In the detailed description of exemplary processing hereinafter, the term "ringgear" is sometimes used in place of "flywheel"; they mean the same thing; the abbreviation "RGT" means "ringgear teeth", a stored factor indicating the number of teeth on the flywheel of the engine under test. This may be determined and entered from engine specifications, or as set forth the aforementioned application of Stick et al, Serial No. Other abbreviations include: "RSLT" = result register; "MEM" = memory; "Ctr" = counter; "Factor" means a memory location or a register where the factor is available; "CMPLT" means A/D conversion is completed; "spd" means speed; and other abbreviations are apparent in the drawing. Parentheticals after "MEM", such as "(Freq)", indicate addresses, chosen at will by the programmer, or partially determined by counter two, if so indicated.

The exemplary system herein is designed for four-stroke, six-cylinder engines. If desired, the programming may be altered to compare counts (particularly counter two) with loaded indications of engine variables, such as cylinders, in a well known fashion.

Figure 4:
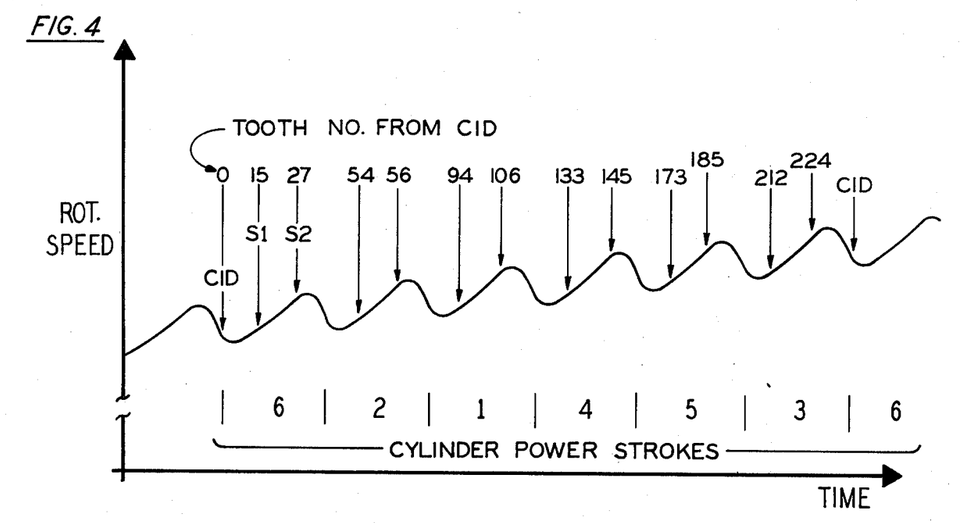
FIGS. 4 and 5 are diagramatic illustrations of principles of the invention.

Referring now to FIG. 4, the present invention analyzes the instantaneous, sub-cyclic fluctuations in actual engine speed as an indication of the acceleration provided by each of the cylinders, which in turn provides an indication of health of each cylinder relative to the other cylinders, referred to herein as relative power contribution.

This is done by sensing the CID signal, which provides a known starting place, and then measuring speed every so often, in response to the numbers of teeth which pass the tooth sensor, the speed measurement itself comprising the tooth-to-tooth speed measurement made in accordance with FIG. 3, as described hereinbefore.

To determine an adequate speed has been reached so that individual cylinder acceleration rates will be meaningful when compared to each other, a starting speed is herein taken to be 900 rpm, although this could vary. For this speed measurement alone, the number of ringgear teeth must be known, and this can be precalculated into a number representing the tooth timer clock count which will be apparent at 900 rpm, for direct comparison with the tooth timer to determine when 900 rmp's have been reached. The manner of preconverting the desired speed to equivalent clock counts in the tooth timer is disclosed in the aforementioned copending application of Willenbecher et al.

The accurate CID indication can be obtained as set forth in the aforementioned copending application of Tedeschi, which describes in more detail the CId centering apparatus 18 of FIG. 1 herein.

In the exemplary processing described hereinafter with respect to the present invention, a two stroke engine having six cylinders is considered. Counter two is used to keep track of twelve successive speed measurements, two for each cylinder. However, if an engine having a different number of cylinders is to be tested, then the numbers will change in a commensurate fashion. On the other hand, in a general purpose diagnostic system incorporating the present invention, the number of cylinders may be entered into a memory location and this may be continuously compared with the counter, or accommodation made in some other fashion well known to those skilled in the processing arts.

Figure 6:
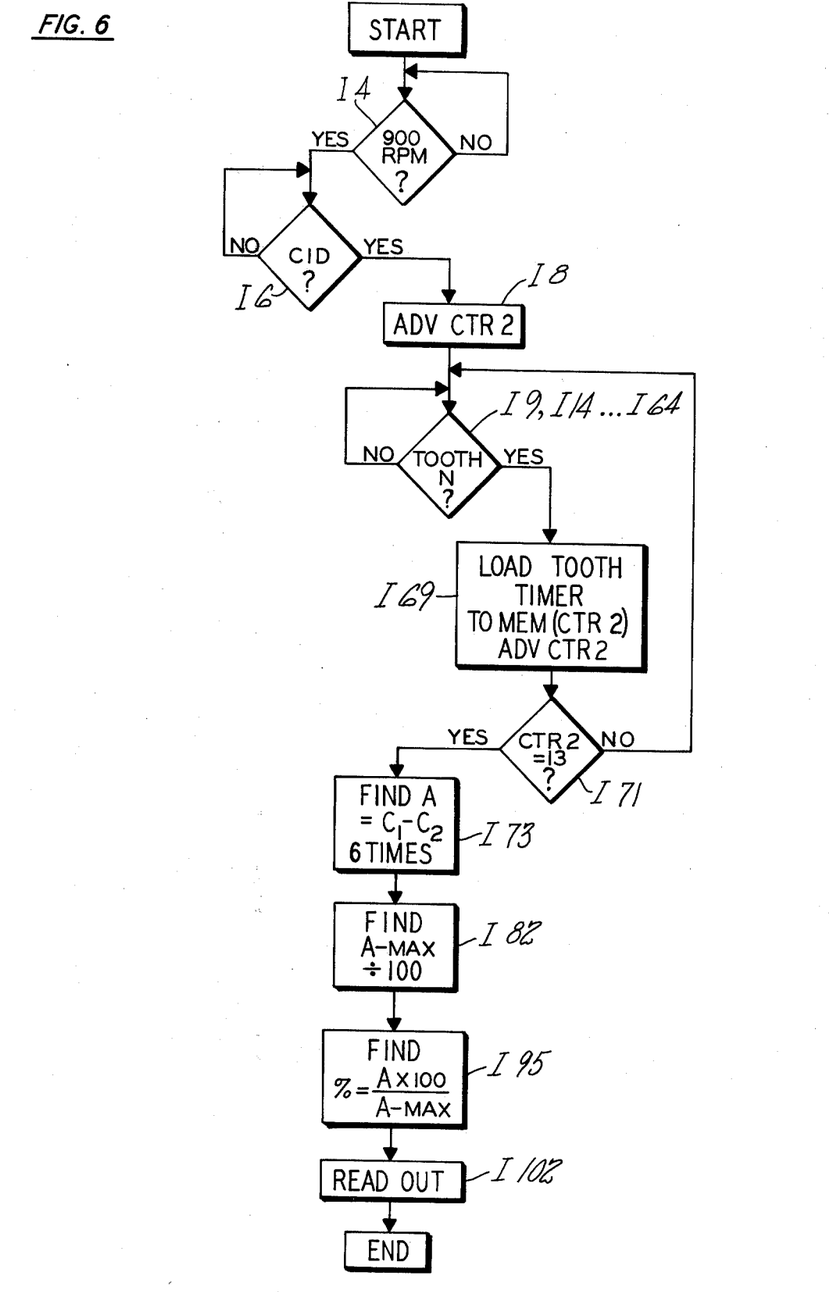
FIG. 6 is a simplified logic flow chart of illustrative processing in accordance with the invention.

An exemplary process for starting the operation, achieving the proper speed and sensing the CID signal may be in accordance with the following instructions:

| START | 1. Reset Counters 1 and 2, and A and B REGS |
| | 2. Load Speed Buffer to A REG |
| | 3. Load Tooth timer to B REG |
| | 4. Subtract; Skip one if - |
| | 5. Branch to 3 |
| | 6. Skip one if CID |
| | 7. Branch to 6 |
| | 8. Advance counter 2 |

This is illustrated in FIG. 6 hereof with the portions of FIG. 6 identified by relevant instructions.

As soon as the CID has been sensed, the program monitors the decoded tooth counts from the tooth counter, to sense positions clearly in the power stroke of each successive cylinder, as is illustrated in FIG. 4. This is done in the exemplary processing herein with a sequence of instructions which sense the tooth counts in order in dependence upon the setting of counter number 2, which identifies which particular speed reading is to be made. An exemplary process for making the tooth match illustrated in FIG. 4, which in turn causes loading of the tooth timer to memory as set forth in instructions 69 et seq, may be in accordance with instructions 9, 14 and so forth:

| TOOTH MATCH | 9. Skip one if Counter 2 = 1 |
| | 10. Branch to 14 |
| | 11. Skip 1 if TOOTH = 15 |
| | 12. Branch to 11 |
| | 13. Branch to 69 |
| | 14. Skip one if Counter 2 = 2 |
| | 15. Branch to 19 |
| | 16. Skip 1 if TOOTH = 27 |
| | 17. Branch to 16 |
| | 18. Branch to 69 |
| | 19. Skip one if Counter 2 = 3 |
| | 20. Branch to 24 |
| | . |
| | . |
| | 61. Skip 1 if TOOTH = 207 |
| | 62. Branch to 61 |
| | 63. Branch to 69 |
| | 64. Skip one if Counter 2 = 12 |
| | 65. Branch to 73 |
| | 66. Skip 1 if TOOTH = 224 |
| | 67. Branch to 66 |
| | 68. Branch to 69 |

Each time that the tooth match relating to the particular setting of counter 2 is sensed, the contents of the tooth timer is stored in memory at a location relating to that particular speed reading as identified by counter 2, which may be according to the following instructions:

| | 69. Load TOOTH counter to MEM (Ctr 2) |
|---|---|
| | 70. Advance Counter 2 |
| | 71. Skip 1 if Counter 2 = 13 |
| | 72. Branch to 9 |

Figure 5:
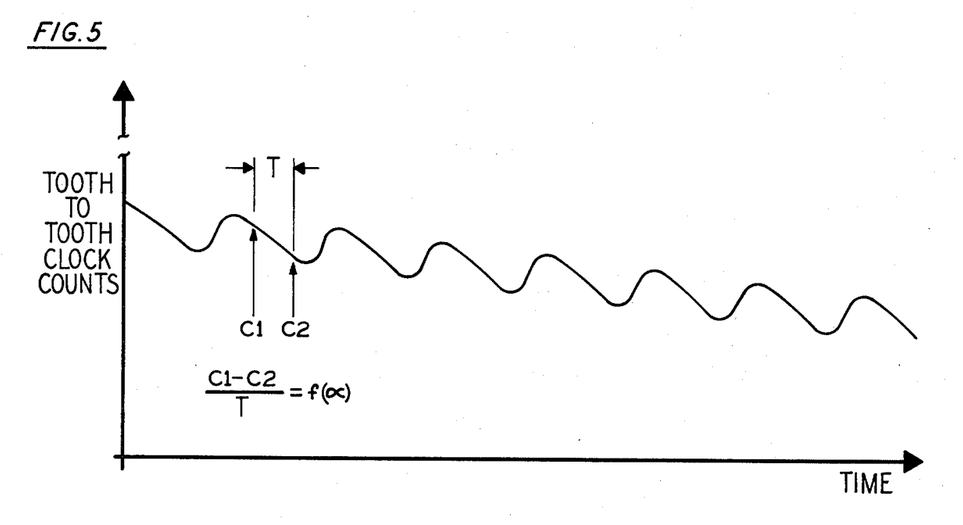

When all of the speed readings have been made then the differences between the counts for each cylinder can be made as illustrated in FIG. 5, bearing in mind that a slower speed will allow a greater count to accumulate between each tooth, and a higher speed renders the counts smaller, as illustrated in FIG. 5. Thus the speed indication for each cylinder is made by subtracting the second count for that cylinder from the first count of that cylinder which, when proportioned to the time across the individual counts, will relate to the acceleration of the engine during that time period. As described more fully hereinafter, the present invention utilizes the instantaneous sub-cyclic behavior of the engine (identified by the successive counts from the tooth timer) in a relative fashion, so that relationship to time need not be made. However, if the degree of sophistication required in any given implementation of the present invention warrants taking into account the increase in the overall engine speed as the successive cylinder accelerations are made, then this may be accomplished by dividing each cylinder's count (C1 - C2 in FIG. 5) by one of those counts to normalize it; but this leaves the problem of very small numbers being divided by very large numbers which introduces rounding off errors, in dependence upon the size of the processing system which is being used. On the other hand, cross multiplication can be made such that the difference (C1 - C2, FIG. 5) for cylinder six (FIG. 4) could be multiplied by C1 of cylinder three in FIG. 4 and vice versa, and the difference taken for cylinder two could be multiplied by C1 for cylinder five and vice versa, and the difference for cylinder one could be multiplied with C1 for cylinder four and vice versa to provide normalizing. Since this may be done with straightforward processing well within the skill of the art, and since the particular methodology used for normalization depends upon the particular data processing apparatus used in any given diagnostic system, this normalizing is not shown in any particular detail herein. One taking of the difference is set forth in instructions 74–81:

| FIND | 74. Advance Counter 2 |
|---|---|
| A's | 75. Load MEM (Ctr 2) to A REG |
| (C1-C2) | 76. Advance Counter 2 |
| | 77. Load MEM (Ctr 2) to B REG |
| | 78. Subtract |
| | 79. Load RSLT to MEM (Ctr 2) |
| | 80. Skip one if Counter 2 = 12 |
| | 81. Branch to 74 |

Thereafter, each of the acceleration factors (C1-C2) taken for each of the cylinders is brought out in turn to B register for comparison with the A register and if it is larger, it is transferred to the A register so that the A register will end up with the largest difference in it. Then ratios are taken by dividing the largest one by 100 in the first instance, and then multiplying the rest by it so as to end up with percentages that may be read out. The largest factor is found in instructions 82–90 and the percentages are taken in instructions 91–101, as follows:

| FIND | 82. Reset Counter 2, and A and B REGS |
|---|---|
| A | 83. Advance Counter 2 |
| MAX | 84. Advance Counter 2 |
| | 85. Load MEM (Ctr 2) to B REG |
| | 86. Subtract |
| | 87. Skip one if - |
| | 88. Load B REG to A REG |
| | 89. Skip one if Counter 2 = 12 |
| | 90. Branch to 83 |
| | 91. Load 100 Factor to B REG |
| MAX | 92. Multiply |
| ÷ 100 | 93. Load RSLT to B REG |
| | 94. Reset Counter 2 |
| A/A MAX × 100 | 95. Advance Counter 2 |
| | 96. Advance Counter 2 |
| | 97. Load MEM (Ctr 2) to A REG |
| | 98. Divide |
| | 99. Load RSLT to MEM (Ctr 2) |
| | 100. Skip 1 if Counter 2 = 12 |
| | 101. Branch to 95 |

Now the diagnostic procedure is complete. If desired, the system may read out the percentage of each cylinder to the print and display apparatus 27 of FIG. 1. If the operator had entered the cylinder number indicating which cylinder the CID sensor was placed to identify, then that number could be available to cause read out of relative power contribution results on a firing order basis, beginning with the cylinder where the CID sensor is placed, in accordance with the following steps:

| READ- | 102. Load CID cyl Factor to A REG |
|---|---|
| OUT | 103. Reset Counter 2 |
| | 104. Advance Counter 2 |
| | 105. Load Counter 2 to B REG |
| | 106. Subtract |
| | 107. Skip one if - |
| | 108. Branch to 104 |
| | 109. Load MEM (Ctr 2) to Print & Display |
| | 110. Skip one if Counter 2 = 6 |
| | 111. Branch to 104 |
| | 112. Reset Counter 2 |
| | 113. Advance Counter 2 |
| | 114. Load Counter 2 to B REG |
| | 115. Subtract |
| | 116. Skip one if + |
| | 117. Branch to 109 |
| | 118. END ROUTINE |

Similarly, although the invention has been shown and described with respect to exemplary embodiments thereof, it should be understood by those skilled in the art that the foregoing and various other changes, additions and omissions may be made therein and thereto without departing from the spirit and the scope of the invention.

Having thus described typical embodiments of our invention, that which we claim and new and desire to secure by Letters Patent is:

1. Apparatus for providing measurements indicative of sub-cyclic dynamic operating conditions of an internal combustion engine, comprising:

speed sensing means responsive to rotation through successive small angles of revolution of a member of the engine for generating a signal for each occurrence thereof, said angles each being a small fraction of an engine cylinder stroke sub-cycle;

means responsive to each signal of said speed sensing means for providing successive interval manifestations each indicating the time interval for revolution of the engine through the related one of said small angles; and processing means responsive to at least a pair of said interval manifestations related to each cylinder stroke for providing a measure of a dynamic operating condition of said engine.

2. Apparatus according to claim 1 wherein said processing means registers said interval manifestations relating to successive ones of the cylinders of said engine as said engine rotates, and provides a dynamic operating measurement related to individual ones of said cylinders based on said interval manifestations.

3. Apparatus according to claim 1 wherein a plurality of said interval manifestations are recorded for each cylinder sub-cycle during a cycle of operation of said engine, and said time interval manifestations are combined in a manner to provide a measure of dynamic engine operating conditions in response to the relative magnitude of certain of said interval manifestations with respect to others of said interval manifestations, whereby speed related dynamic indications are obtainable without conversion of said interval manifestations to speed dimensions.

4. Apparatus according to claim 1 wherein said processing means is responsive to a pair of said interval manifestations related to each cylinder to subtract one from the other, thereby providing a measure of acceleration of the engine during the portion of the stroke of the related cylinder.

5. Apparatus for providing measurements of relative cylinder power contribution of a reciprocating intrnal combustion engine, comprising:
means adapted to be disposed on the engine for sensing the passage of indicia disposed on the member directly connected to and rotating with the crankshaft of the engine, said indicia delineating successive, substantially equal small angles, each of said small angles being a fraction of the angle of revolution of the engine during the power stroke of one of the cylinders thereof, said sensing means providing a sense signal in response to an integral number of the indicia:
timing means responsive to said sensing means for providing a time increment data manifestation of the elapsed time between the occurrences of said sense signals from said sensing means;
means providing a signal indicative of a cycle of operation of the engine; and
means responsive to said cycle signal and to successive ones of said time increment data manifestations and to said sensing means for identifying ones of said time increment data manifestations in pairs, each pair relating in time to the operation of said engine to corresponding sub-cyclic periods of the strokes of successive ones of the cylinders thereof, for providing the difference between each pair, and for providing an acceleration manifestation in response to said difference for each cylinder, acceleration manifestation being indicative of the acceleration of the engine during the power stroke of a related cylinder.

6. Apparatus according to claim 5 wherein said processing means further comprises means to determine the maximum acceleration from the set of accelerations relating to all of said cylinders and for providing an indication from each cylinder as the relative acceleration for that cylinder compared to the relative acceleration for the cylinder having the maximum acceleration as an indication of relative power contribution.

7. In a method of determining relative sub-cyclic dynamic operating conditions of a reciprocating internal combustion engine, the steps of:
measuring the time required for the engine to rotate through substantially equal, successive small angles, said angles being a fraction of the angle of revolution of the engine allocated to the power stroke for each cylinder thereof; measuring a full cycle of engine revolutions, said full cycle of engine revolutions comprising one revolution in a two stroke engine and two revolutions in a four stroke engine;
measuring angles which comprise a substantial portion of a power stroke of each cylinder and angles which comprise cylinder to cylinder angular increments from the beginning of said power stroke angles;
and determining the speed at the start of each power stroke angle and at the end of each of said power stroke angles for each of said cylinders, taking the difference between the start and end speed for each of said cylinders to provide a measure of acceleration therefore, and indicating said accelerations in a manner to describe relative cylinder power contribution.

* * * * *

UNITED STATES PATENT AND TRADEMARK OFFICE
CERTIFICATE OF CORRECTION

PATENT NO. : 4,064,747

DATED : December 27, 1977

INVENTOR(S) : Richard J. Rackliffe; Harvey J. Goodfriend; Lee R. Armstrong

It is certified that error appears in the above-identified patent and that said Letters Patent are hereby corrected as shown below:

Column 3, line 25 "diagramatic" should read --diagrammatic--

Column 4, line 44 "positions" should read --portions--

Column 6, line 63 "64", first occurrence, should read --63--

Column 7, line 26 "set forth the" should read --set forth in the--

Column 7, line 27 "Stick et al, Serial No." should read --Stick et al.--

Column 8, line 3 "CId" should read --CID--

Column 9, line 47 "One" should read --The--

Column 10, line 51 "claim and new" should read --claim as new--

Column 11, line 27 "intrnal" should read --internal--

Signed and Sealed this

Twenty-second Day of August 1978

[SEAL]

Attest:

RUTH C. MASON
Attesting Officer

DONALD W. BANNER
Commissioner of Patents and Trademarks